(12) United States Patent
O'Connell et al.

(10) Patent No.: US 11,862,390 B2
(45) Date of Patent: Jan. 2, 2024

(54) CHARGING APPARATUS WITH FLEXIBLE DIAPHRAGM FOR COOLING

(71) Applicant: Nokia Technologies Oy, Espoo (FI)

(72) Inventors: Diarmuid O'Connell, Athy (IE); Akshat Agarwal, Clonmagadden (IE); Ian Davis, Wicklow (IE); Nicholas Jeffers, Wicklow (IE)

(73) Assignee: Nokia Technologies Oy, Espoo (FI)

( * ) Notice: Subject to any disclaimer, the term of this patent is extended or adjusted under 35 U.S.C. 154(b) by 312 days.

(21) Appl. No.: 17/324,642

(22) Filed: May 19, 2021

(65) Prior Publication Data

US 2021/0366652 A1  Nov. 25, 2021

(30) Foreign Application Priority Data

May 20, 2020 (EP) .................................... 20175732

(51) Int. Cl.
| | |
|---|---|
| *H01M 10/44* | (2006.01) |
| *H01M 10/46* | (2006.01) |
| *H01F 38/14* | (2006.01) |
| *H01F 27/36* | (2006.01) |
| *G05D 7/01* | (2006.01) |
| *H01F 27/08* | (2006.01) |
| *H02J 7/00* | (2006.01) |

(52) U.S. Cl.
CPC .......... *H01F 38/14* (2013.01); *G05D 7/0106* (2013.01); *H01F 27/085* (2013.01); *H01F 27/366* (2020.08); *H02J 7/0044* (2013.01)

(58) Field of Classification Search
CPC ........ H02J 7/0044; H02J 7/0042; H02J 50/10; H02J 50/005; H01F 38/14; H01F 27/366; H01F 27/085; G05D 7/0106
USPC .......................... 320/107, 108, 114, 115, 150
See application file for complete search history.

(56) References Cited

U.S. PATENT DOCUMENTS

| | | |
|---|---|---|
| 9,860,660 B1 | 1/2018 | Bosscher et al. |
| 2009/0174999 A1 | 7/2009 | Sauciuc et al. |
| 2016/0254690 A1 | 9/2016 | Helberg et al. |
| 2016/0329735 A1 | 11/2016 | Helberg et al. |
| 2017/0367215 A1 | 12/2017 | Wu et al. |

FOREIGN PATENT DOCUMENTS

| | | | |
|---|---|---|---|
| CN | 105449812 A | * | 3/2016 |
| EP | 2965941 A1 | | 1/2016 |

OTHER PUBLICATIONS

Extended European Search Report received for corresponding European Patent Application No. 20175732.5, dated Aug. 28, 2020, 8 pages.

* cited by examiner

*Primary Examiner* — Edward Tso

(74) *Attorney, Agent, or Firm* — Harrington & Smith

(57) ABSTRACT

A charging apparatus for inductive charging. The charging apparatus comprises one or more charging coils configured to transfer power to a mobile apparatus and at least one flexible diaphragm configured so that movement of the flexible diaphragm directs air flow towards the mobile apparatus. At least one of, the one or more charging coils or actuating circuitry for actuating the one or more charging coils are mounted on the flexible diaphragm.

18 Claims, 6 Drawing Sheets

CHARGING APPARATUS WITH FLEXIBLE DIAPHRAGM FOR COOLING

TECHNOLOGICAL FIELD

Embodiments of the present disclosure relate to charging apparatus. Some relate to charging apparatus for charging mobile electronic apparatus by inductive charging.

BACKGROUND

Inductive charging of an electronic mobile apparatus can lead to unwanted heat being generated at the electronic mobile apparatus. As charging rates increase this may increase the amount of unwanted heat that is generated. This can be problematic for the apparatus being charged as the excess heat could lead to damage of the battery or other components of the electronic mobile apparatus.

BRIEF SUMMARY

According to various, but not necessarily all, examples of the disclosure there is provided a charging apparatus comprising: one or more charging coils configured to transfer power to a mobile apparatus; and at least one flexible diaphragm configured so that movement of the flexible diaphragm directs air flow towards the mobile apparatus; wherein at least one of, the one or more charging coils or actuating circuitry for actuating the one or more charging coils are mounted on the flexible diaphragm.

The charging apparatus may comprise at least one ferrite shield provided between the one or more charging coils and the flexible diaphragm.

The charging coils may be positioned on the diaphragm so as to control a bending mode of the flexible diaphragm.

The ferrite shield may also be provided on the flexible diaphragm.

The ferrite shield may be configured to direct a magnetic field generated by the one or more charging coils towards the mobile apparatus.

The ferrite shield may be configured to, at least partially, block a magnetic field generated by the one or more charging coils from impinging circuitry within the charging apparatus.

The charging apparatus may comprise one or more vents positioned above the flexible diaphragm and configured to enable air flow towards a mobile apparatus.

The charging apparatus may comprise one or more vents configured to enable air flow towards circuitry within the charging apparatus.

The charging apparatus may comprise actuating circuitry configured to actuate movement of the flexible diaphragm.

The actuating circuitry may comprise one or more coils configured to electromagnetically interact with the one or more charging coils.

At least part of the actuating circuitry may be provided on the flexible diaphragm.

The charging coils may be configured to receive data from the mobile apparatus.

The data received from the mobile apparatus may comprises data relating to the temperature of the mobile apparatus.

The flexible diaphragm may comprise an electrically insulating material.

According to various, but not necessarily all, examples of the disclosure there is provided a system comprising an apparatus as claimed in any preceding claim and a mobile apparatus.

BRIEF DESCRIPTION

Some examples will now be described with reference to the accompanying drawings in which.

DETAILED DESCRIPTION

Examples of the disclosure relate to a charging apparatus 101 for inductively charging a separate, mobile apparatus 201. The charging apparatus 101 comprises a flexible diaphragm 103 which is configured to generate an air flow to enable cooling of the mobile apparatus 201 during inductive charging.

Figure 1:
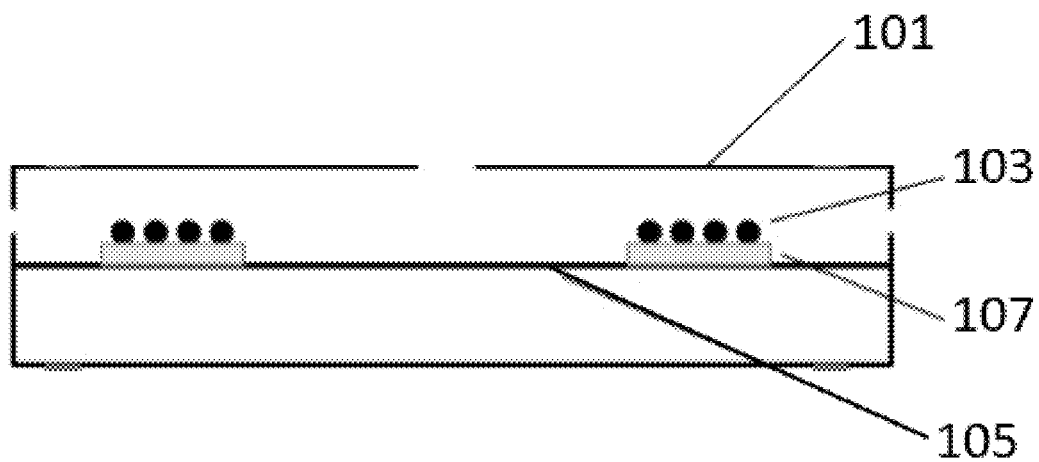
FIG. 1 shows an example of the subject matter described herein.

FIG. 1 shows a charging apparatus 101 according to examples of the disclosure. The example charging apparatus 101 comprises one or more charging coils 103, one or more ferrite shields 107 and a flexible diaphragm 105. It is to be appreciated that only components referred to in the following description are shown in FIG. 1 and that the charging apparatus 101 can comprise additional components that are not shown in FIG. 1.

The one or more charging coils 103 are configured to transfer power to a mobile apparatus. The one or more charging coils 103 enable inductive charging of a separate, mobile apparatus when the mobile apparatus is positioned close to the charging apparatus 101. In some examples the charging coils 103 enable charging of the mobile apparatus by near-field inductive power transfer or any other suitable type of inductive charging method.

When the mobile apparatus is being charged it is positioned adjacent to the charging apparatus 101 so that one or more corresponding charging coils within the mobile apparatus can receive power from the charging coils 103 in the charging apparatus 101. In the example of FIG. 1 the mobile apparatus can be positioned on, or adjacent to, a surface of the charging apparatus 101.

The one or more charging coils 103 can comprise any suitable electrically conductive material such as copper.

The at least one ferrite shield 107 is provided between the one or more charging coils and the flexible diaphragm. In the example shown in FIG. 1 the at least one ferrite shield is provided underneath the one or more charging coils 103. The ferrite shield 107 can be configured to protect electronic components in the charging apparatus 101 from the electromagnetic fields of the one or more charging coils 103. The ferrite shield 107 can be configured to, at least partially, block a magnetic field generated by the one or more charging coils 103 from impinging circuitry within the charging apparatus 101. the ferrite shield 107 can be configured to direct a magnetic field generated by the one or more charging coils 103 towards the mobile apparatus 101. The ferrite shield 107 can comprise any suitable material with high magnetic permeability and low electrical conductivity.

The charging apparatus 101 also comprises a flexible diaphragm 105. The flexible diaphragm 105 is configured so that it can oscillate about an equilibrium position. The flexible diaphragm 105 is configured so that, when the charging apparatus 101 is in use, oscillation of the flexible diaphragm 105 directs air flow towards the mobile apparatus being charged.

The flexible diaphragm 105 can comprise any suitable flexible and electrically insulating material. In some examples the flexible diaphragm 105 can comprise rubber or any other suitable material.

In the example shown in FIG. 1 the one or more charging coils 103 are provided on the flexible diaphragm 105. The ferrite shield 107 can also be provided on the flexible diaphragm 105. The ferrite shield 107 is provided between the flexible diaphragm 105 and the one or more charging coils 103. The charging coils 103 and ferrite shield 107 can be printed on the flexible diaphragm 105 using an electro deposition process or any other suitable process.

In this example when the flexible diaphragm 105 is moving this will create an air flow towards the mobile apparatus to cause cooling of the mobile apparatus and will also cause movement of the charging coils 103. The charging coils 103 will oscillate about a mean position during movement of the flexible diaphragm 105 so that the average power transmitted to the mobile apparatus over a period of time does not change.

It is to be appreciated that in other examples the one or more charging coils 103 could be provided in other locations within the charging apparatus 101.

Figure 2:
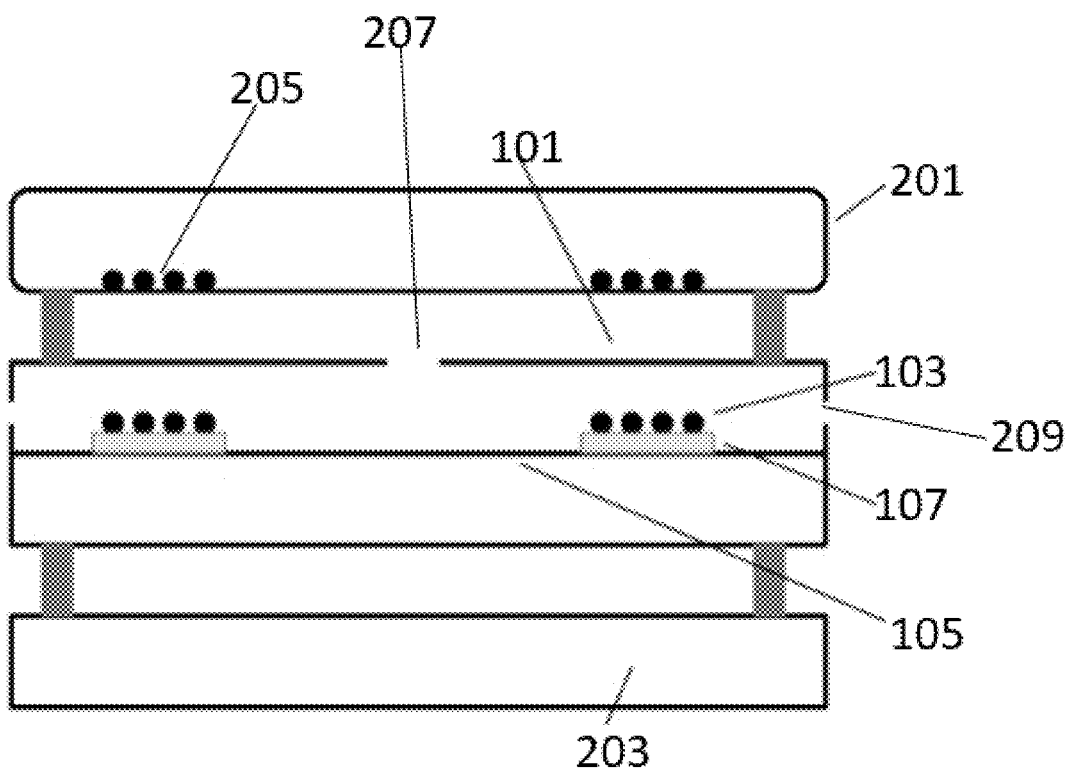
FIG. 2 shows another example of the subject matter described herein.

FIG. 2 illustrates a charging apparatus 101 being used to charge a separate mobile apparatus 201.

The mobile apparatus 201 could be a mobile telephone, a laptop, a smart watch or any other suitable electronic mobile apparatus 201. The mobile apparatus 201 is portable so that it can be easily carried by a user. The mobile apparatus 201 is separate to the charging apparatus 101 in that it can function independently of the charging apparatus 101.

In the example shown in FIG. 2 the mobile apparatus 201 comprises one or more charging coils 205. Only components of the mobile apparatus 201 that are referred to in the following description are shown in FIG. 2. It is to be appreciated that the mobile apparatus 201 could comprise additional components that are not shown in FIG. 2. For instance, the mobile apparatus 201 could comprise components such as, batteries, control circuitry, user interfaces and transceiver circuitry or any other suitable components.

The charging coil 205 of the mobile apparatus 201 is provided close to a surface of the mobile apparatus 201 so as to enable inductive charging of a battery of the mobile apparatus 201 when the mobile apparatus 201 is positioned close to the charging apparatus 101 as shown in FIG. 2.

In the example of FIG. 2 the mobile apparatus 201 is positioned adjacent to the charging apparatus 101 so that power can be transferred from the charging coils 103 of the charging apparatus 101 to the corresponding charging coils 205 and circuitry within the mobile apparatus 201.

The charging apparatus 101 comprises charging coils 103, a flexible diaphragm 105 and a ferrite shield 107 which can be as shown in FIG. 1 and described above.

The charging apparatus 101 also comprises circuitry 203. The circuitry 203 can comprise electronic components such as a controller comprising a processor and memory. The controller can enable control of the charging apparatus 101. The controller can control power provided to the charging coils 103. In some examples the controller can enable actuation of the flexible diaphragm 105. For example, the controller can control when the flexible diaphragm 105 is moved. The controller can be configured to control the frequency with which the flexible diaphragm 105 is actuated.

In the example of FIG. 2 the circuitry 203 is provided underneath the flexible diaphragm 105. The circuitry 203 is provided on an opposite side of the flexible diaphragm 105 to the charging coils 103 The ferrite shield 107 is provided between the charging coils 103 and the circuitry 203 so as to protect the circuitry 203 from electromagnetic fields of the charging coils 103.

The charging apparatus 101 also comprises vents 207, 209 configured to enable air flow towards the mobile apparatus 201. In the example of FIG. 2 a first set of vents 209 are provided in the side of the charging apparatus 101, these enable air to be drawn into the charging apparatus 101. A second vent 207 is provided in an upper surface of the charging apparatus 101. The second vent 207 is positioned within the charging apparatus 101 so that when the charging apparatus 101 is in use the second vent 207 is positioned in proximity to the mobile apparatus 201. The second vent 207 is configured to enable air to be directed out of the charging apparatus 101 and towards the mobile apparatus 201.

In the example shown in FIG. 2 the vents 207, 209 are configured to direct air flow towards the mobile apparatus 201. It is to be appreciated that in other examples vents could be provided to direct air flow in other directions. For example, one or more vents could be provided to enable air flow to be directed towards the circuitry 203 within the charging apparatus 101. Such vents could be provided beneath the flexible diaphragm. This can enable the air flow generated by the flexible diaphragm 105 to be used to cool both the mobile apparatus 101 and the circuitry 203 within the charging apparatus 101.

Figure 3:
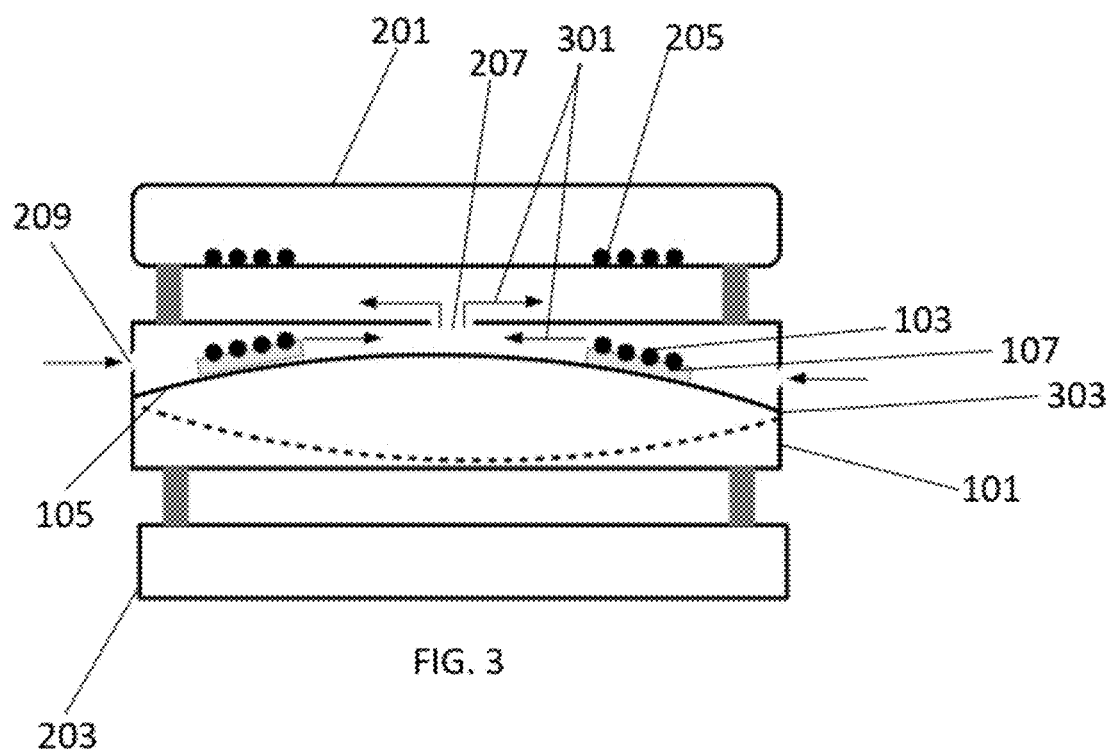
FIG. 3 shows another example of the subject matter described herein.

FIG. 3 illustrates the flexible diaphragm 105 of the charging apparatus 101 being used to generate air flow to cool the separate mobile apparatus 201.

The flexible diaphragm 105 oscillates about an equilibrium position. This causes air to be drawn into the charging apparatus 101 through the first vent 209 and directed out of the charging apparatus 101 and towards the mobile apparatus 201 through the second vent 207 as indicated by the arrows 301. This air flow enables cooling of the mobile apparatus 201.

In the example shown in FIG. 3 the flexible diaphragm 105 is oscillating in a first bending mode. In this first bending mode nodes 303 are only provided at the edge of the flexible diaphragm 105. The maximum displacement of the flexible diaphragm 105 occurs at the centre of the flexible diaphragm 105. In the example of FIG. 3 the vents 207 of the charging apparatus 101 are arranged so that the location of the maximum displacement of the flexible diaphragm 105 is positioned underneath the first vent 207. This enables the displacement of the flexible diaphragm 105 to force the air flow through the vent 207 and towards the mobile apparatus 201.

In the example of FIG. 3 the charging coils 103 are mounted on the flexible diaphragm 105 so that the oscillation of the flexible diaphragm 105 also causes movement of the charging coils 103. This can cause the power transferred from the charging coils 103 to the mobile apparatus 201 to fluctuate over time.

Figure 4:
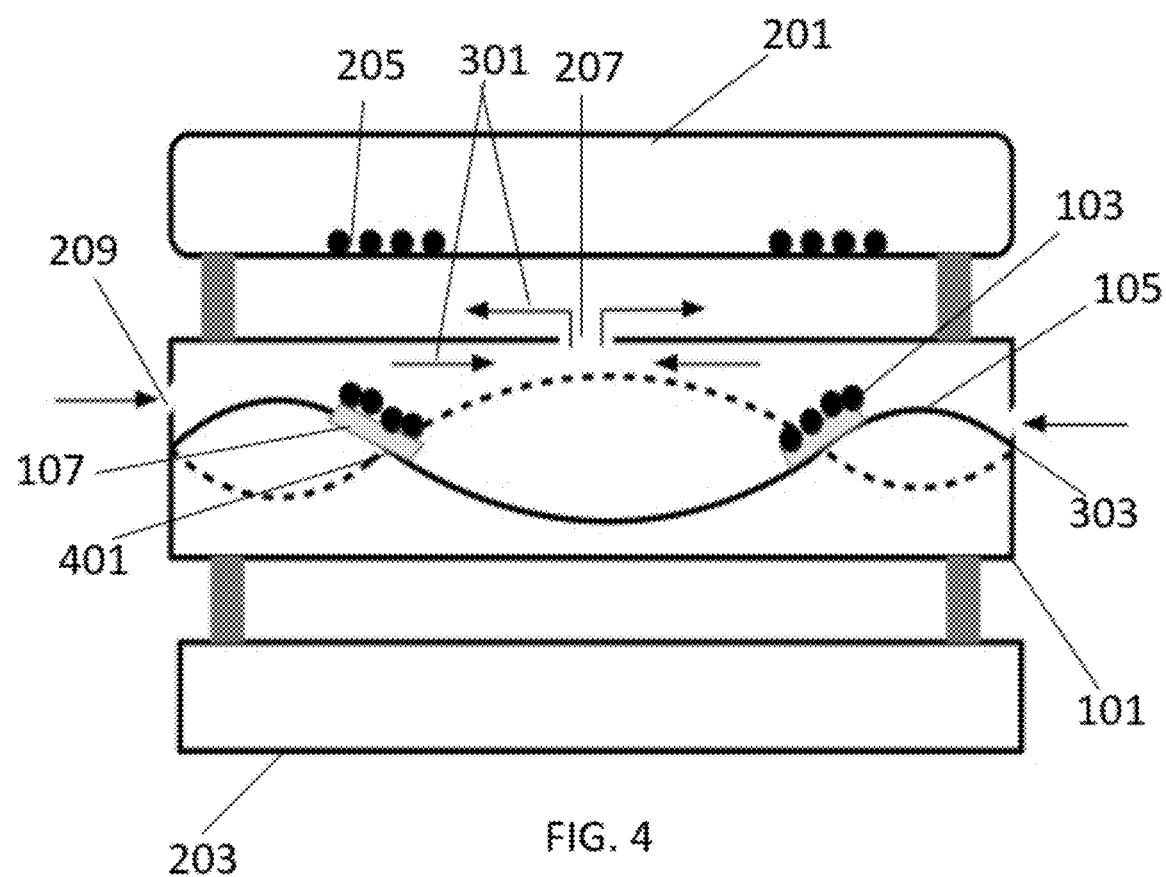
FIG. 4 shows another example of the subject matter described herein.

FIG. 4 illustrates the flexible diaphragm 105 of the charging apparatus 101 being used in a higher bending mode to generate air flow to cool the separate mobile apparatus 201.

In this higher bending mode first nodes 303 are provided at the edge of the flexible diaphragm 105 and second nodes 401 are provided at positions along the length of the flexible diaphragm 105. In the example of FIG. 4 the second nodes 401 are provided at about a quarter of the way along the length of the flexible diaphragm 105 from the edge of the charging apparatus 101.

In the example of FIG. 4 the charging coils 103 are mounted on the flexible diaphragm 105 in the position of the second nodes 401 or close to the position of the second nodes 401. This reduces the movement of the charging coils 103 and so reduces fluctuations in the power transferred to the mobile apparatus 201.

It is to be appreciated that other modes of oscillation of the flexible diaphragm 105 can be used in other examples of the disclosure. In some examples the charging coils 103 can be positioned on the flexible diaphragm 105 so as to enable control of the bending modes of the flexible diaphragm 105. This can help to ensure that the displacement of the flexible diaphragm 105 is sufficient to provide a flow of cooling air towards the mobile apparatus 201.

FIGS. 5A to 5D show another example charging apparatus 101 being used to charge a mobile apparatus 201 according to examples of the disclosure.

Figure 5A:
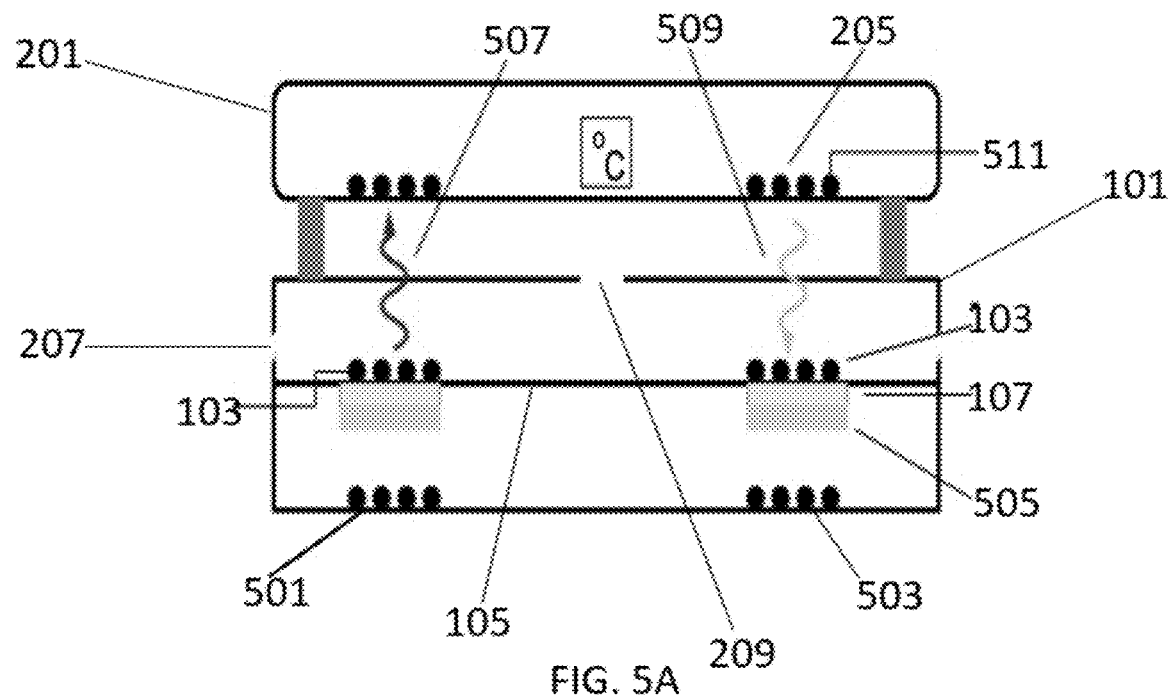
FIGS. 5A to 5D show another example of the subject matter described herein.

FIG. 5A shows a charging apparatus 101 and corresponding mobile apparatus 201. The example charging apparatus 101 comprises one or more charging coils 103, a flexible diaphragm 105 and a ferrite shield 107 which can be as described above.

In the example of FIG. 5A the charging apparatus 301 also comprises actuating circuitry 501. The actuating circuitry 501 is configured to actuate movement of the flexible diaphragm 105.

In the example of FIG. 5A the actuating circuitry 501 comprises one or more actuating coils 503 and one or more magnetic portions 505. The one or more actuating coils 503 are provided underneath the flexible diaphragm 105 so that when the charging apparatus 101 is in use the flexible diaphragm 105 and charging coils 103 are positioned between the actuating coils 503 and the mobile apparatus 201.

The one or more magnetic portions 505 are positioned relative to the actuating coils 503 so that when a current is provided to the actuating coils 503 this generates a varying magnetic field that interacts with the magnetic portions 505 so as to cause movement of the magnetic portions 505. In the example of FIG. 5A the magnetic portions 505 are provided on the flexible diaphragm 105 so that movement of the magnetic portions 505 causes movement of the flexible diaphragm 105.

In the example of FIG. 5A the ferrite shield 107 is provided between the magnetic portions 505 and the one or more charging coils 103. This prevents the magnetic fields from the actuating coils 503 from interacting with the one or more charging coils 103.

In the example shown on FIG. 5A the flexible diaphragm 105 is in the equilibrium position. In this example the flexible diaphragm 105 is not moving so there is no air flow being directed towards the mobile apparatus 201.

In the example shown in FIG. 5A the charging apparatus 101 is in use so that power is being transferred from the one or more charging coils 103 in the charging apparatus 101 to the corresponding charging coils 205 in the mobile apparatus 201 as indicated by the arrow 507.

The charging coils 103 of the charging apparatus 101 and the charging coils 205 of the mobile apparatus 201 can also be configured to enable transfer of data 511 between the mobile apparatus 201 and the charging apparatus 101. In the example shown in FIG. 5A data 511 is transferred from the mobile apparatus 201 to the charging apparatus 101 as indicated by the arrow 509. In some examples the data 511 can be transferred from the mobile apparatus 201 to the charging apparatus 101 via backscattering or any other suitable process.

The data 511 transferred from the mobile apparatus 201 to the charging apparatus 101 can comprise any data 511 that can be used to help control the charging apparatus 101. In some examples the data 511 that is transferred can comprise data 511 relating to the temperature of the mobile apparatus 201 or the temperature of one or more components of the mobile apparatus 201. This temperature information can then be used by the charging apparatus 101 to determine the level of cooling required by the mobile apparatus 201. This temperature information can then be used to determine whether or not to actuate the flexible diaphragm 105. In some examples the temperature information can be used to determine an actuation sequence for the flexible diaphragm 105. The actuation sequence can comprise the frequency and duration of movements of the flexible diaphragm 105.

It is to be appreciated that other information can also be transmitted between the mobile apparatus 201 and the charging apparatus 101. For example, the mobile apparatus 201 can provide information about charging rates and levels which can indicate how effectively power is being transferred from the charging apparatus 101 to the mobile apparatus 201.

Figure 5B:
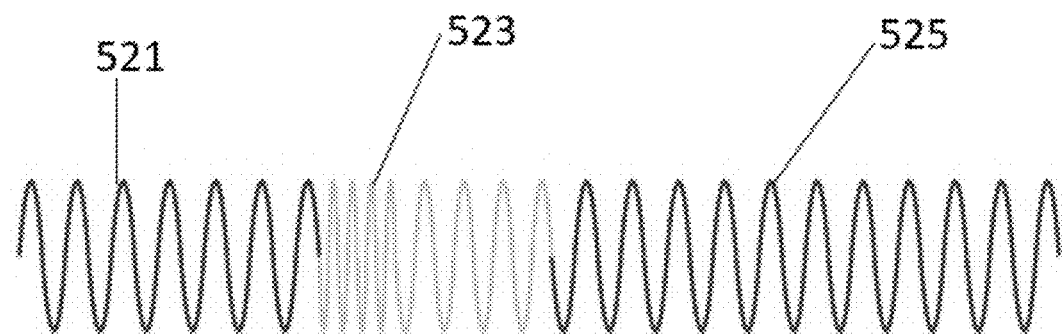

FIG. 5B shows the functions of the charging coils 103 of the charging apparatus 101 over a period of time. During a first period of time 521 the charging coils 103 are transmitting power to the charging coils 205 of the mobile apparatus 201. During a second period of time 523 the charging coils 103 are receiving data 511 from the charging coils 205 of the mobile apparatus 201. The data 511 can comprise data relating to the temperature of the mobile apparatus 201 or any other suitable data. During a third period of time 525 the charging coils 103 return to the function of transmitting power to the charging coils 205 of the mobile apparatus 201. It is to be appreciated that the functions of transmitting power and receiving data 511 can be repeated as many times as is necessary.

Figure 5C:
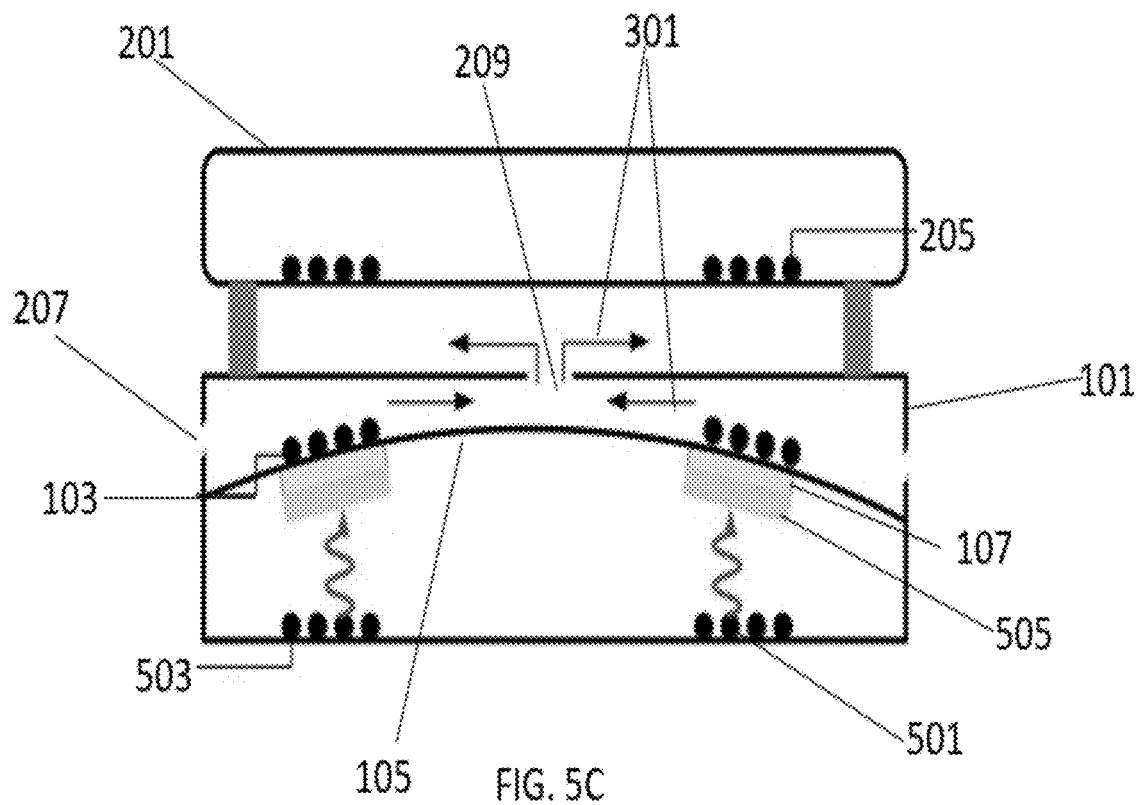

FIG. 5C shows the charging apparatus 101 being used to cool mobile apparatus 201. In this example an input signal has been provided to the actuator coils 503. The input signal can be provided in response to the data 511 received from the mobile apparatus 201. For example, the data 511 received from the mobile apparatus 201 can indicate that the temperature of the mobile apparatus 201, or components within the mobile apparatus 201, has exceeded a threshold and that cooling of the mobile apparatus 201 is required.

In this example the input signal comprises a short pulse of current that is provided to the actuator coils 503. This pulse of current through the actuator coil 503 causes a varying magnetic field which causes movement of the magnetic portions 505. As the magnetic portions 505 are coupled to the flexible diaphragm 105 the movement of the magnetic portions 505 causes movement of the flexible diaphragm 105. The movement of the diaphragm 105 causes the movement of the air as shown by the arrows 301 in FIG. 5C. The air flow enables cooling of the mobile apparatus 201.

Figure 5D:
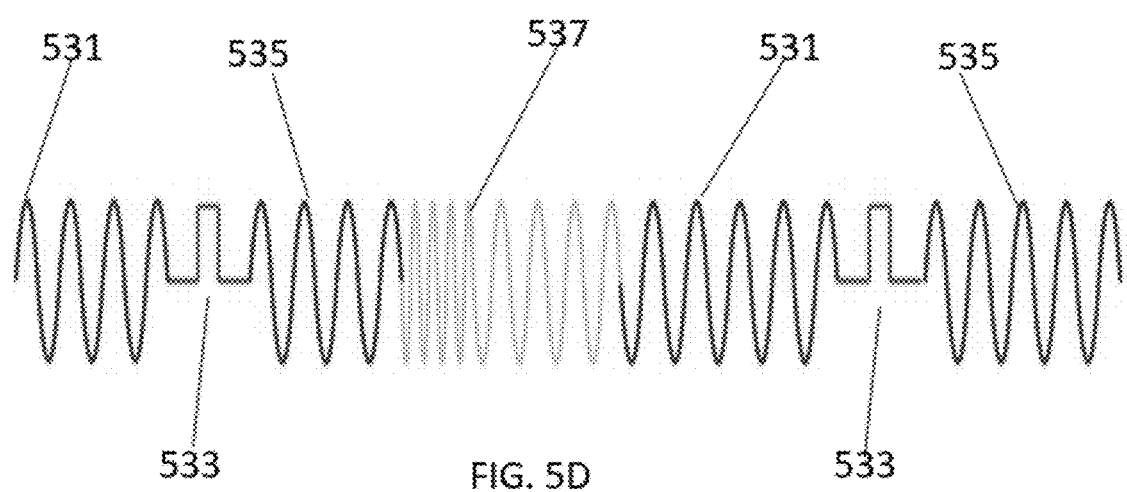

FIG. 5D shows the functions of the charging coils 103 of the charging apparatus 101 over a period of time during which the charging apparatus 101 provides cooling air flow for the mobile apparatus 201.

During a first period of time 531 the charging coils 103 are transmitting power to the charging coils 205 of the mobile apparatus 201.

During a second period of time 533 the actuating coils 503 receive an input signal. The input signal causes a varying magnetic field that causes movement of the magnetic portions 505 and the flexible diaphragm 105. The movement of the flexible diaphragm 105 also causes movement of the charging coils 103 which therefore changes the power transferred to the mobile apparatus 201.

During a third period of time 535 the flexible diaphragm 105 returns to the stationary equilibrium position and the charging coils 103 continue transmitting power to the charging coils 205 of the mobile apparatus 201.

During a fourth period of time 537 the charging coils 103 are receiving data 511 from the charging coils 205 of the mobile apparatus 201. The data 511 can comprise data relating to the temperature of the mobile apparatus 201 or any other suitable data 511.

Following the data 511 being received from the mobile apparatus 201 the charging coils 103 return to the charging mode and repeat the sequence shown in the first three periods of time 531, 533, 535. It is to be appreciated that the functions of transmitting power, moving the flexible diaphragm 105 and receiving data 511 can be repeated as many times as is necessary.

Figure 6A:
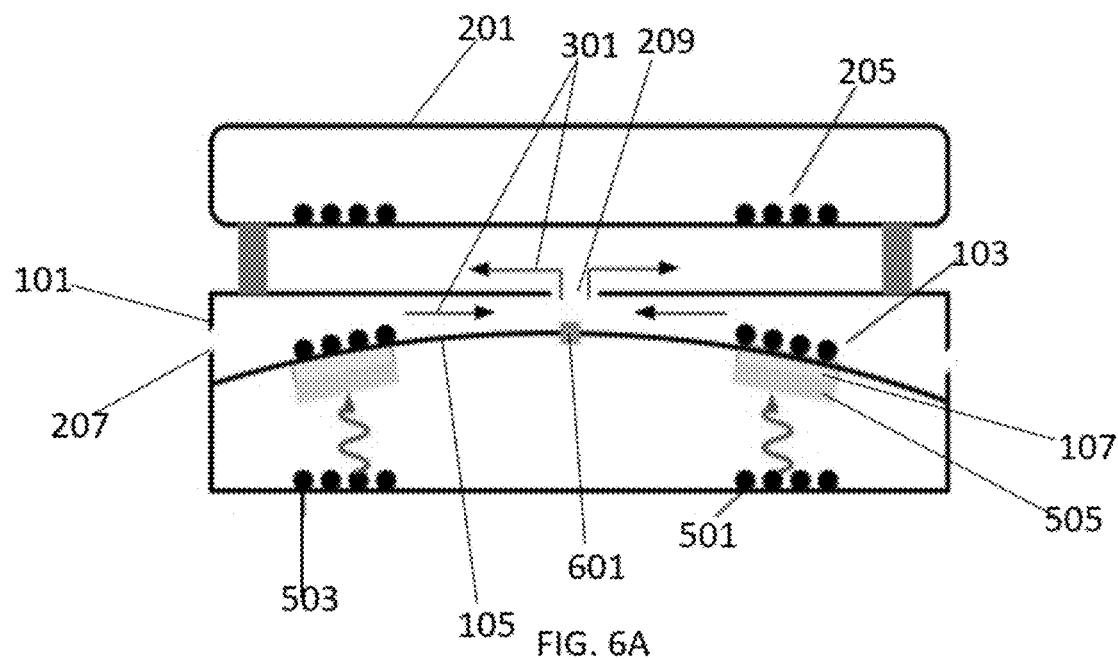
FIGS. 6A to 6C show another example of the subject matter described herein.
Figure 6B:
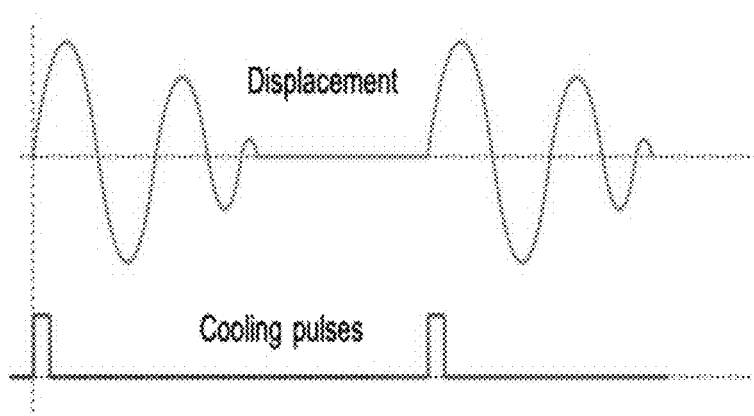
Figure 6C:
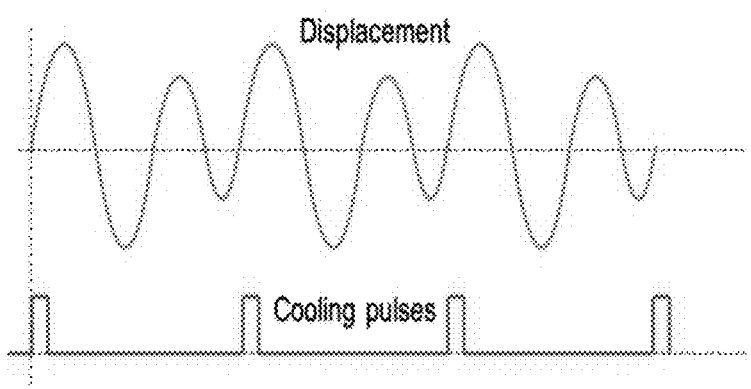

FIGS. 6A to 6C show another example charging apparatus 101 being used to charge a mobile apparatus 201 according to examples of the disclosure.

FIG. 6A shows a charging apparatus 101 and corresponding mobile apparatus 201. The example charging apparatus 101 comprises one or more charging coils 103, a flexible diaphragm 105 and a ferrite shield 107 which can be as described above. The example charging apparatus 101 also comprises actuating circuitry 501 configured to actuate movement of the flexible diaphragm 105. The actuating circuitry 501 can be as shown in FIG. 5A and described above. Other types of actuating circuitry 501 can be provided in other examples of the disclosure.

In the example of FIG. 6A the flexible diaphragm 105 resonates in a first bending mode with a node 303 at the edge of the flexible diaphragm 105 and a region of maximum displacement 601 in the centre of the flexible diaphragm 105. The region of maximum displacement 601 of the diaphragm 105 is positioned underneath the vent 209 that directs air towards the mobile apparatus 201. This enables movement of the flexible diaphragm 105 to force the air flow through the vent 209 towards the mobile apparatus 201.

FIGS. 6B and 6C show the displacement of the centre of the flexible diaphragm 105 and the timing of the input signals to the actuating circuitry 501.

FIG. 6B shows that an interval is provided between the input signals to the actuating circuitry 501. The interval between consecutive input signals is long enough that the flexible diaphragm 105 returns to its equilibrium position and is stationary between consecutive input signals.

In FIG. 6C the interval between the input signals is decreased so that the flexible diaphragm 105 does not return to stationary between consecutive input signals. As shown in FIG. 6C there is some damping of the oscillations over time, however the next input signal is provided before the flexible diaphragm 105 returns to stationary.

The frequency of the input signals can be determined by the data that is received from the mobile apparatus 201. The frequency of the input signals can be determined by the temperature of the mobile apparatus 201 or any other suitable factor.

Figure 7A:
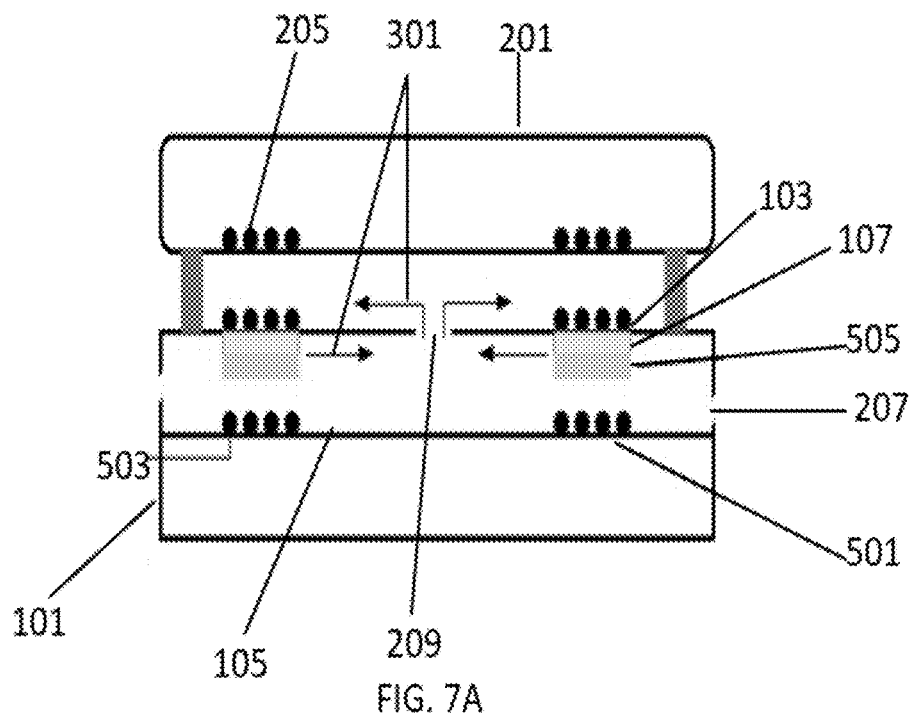
FIGS. 7A to 7B show another example of the subject matter described herein.
Figure 7B:
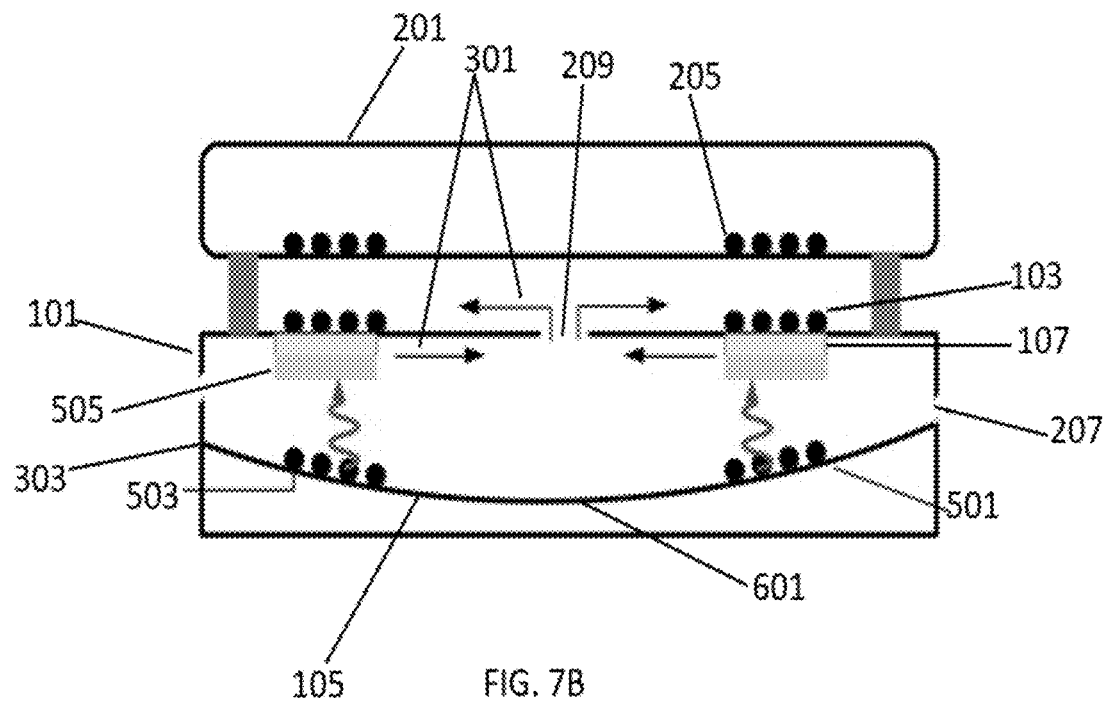

FIGS. 7A to 7B show another example charging apparatus 101 according to examples of the disclosure. In the example of FIGS. 7A and 7B at least part of the actuating circuitry 501 is provided on the flexible diaphragm 105. In the example of FIGS. 7A and 7B the actuating coils 503 are provided on the flexible diaphragm 105. The charging coils 103, ferrite shield 107 and magnetic portions 505 are all provided on a fixed portion of the charging apparatus 101. In the example shown in FIGS. 7A and 7B the charging coils 103 are provided on the surface of the charging apparatus 101 while the ferrite shield 107 and magnetic portions 505 are provided underneath the charging coils 103. It is to be appreciated that other configurations of the actuating circuitry 501 and the charging coils 103 could be used in other examples of the disclosure.

In this example when an input signal is provided to the actuating coils 503 the force generated by the magnetic portions 505 in the varying magnetic field causes movement of the actuating coils 503 and thereby causes the displacement of the flexible diaphragm 105. This therefore causes an air flow as shown by the arrows 301.

FIG. 7B shows the flexible diaphragm 105 oscillating in a first bending mode. In this first bending mode nodes 303 are provided at the edge of the flexible diaphragm 105 while the region of maximum displacement 601 is provided towards the centre of the flexible diaphragm 105. It is to be appreciated that other bending modes could be used in other examples of the disclosure. The actuating coils 503 can be positioned to control the bending modes of the flexible diaphragm 105.

Examples of the disclosure therefore provide a charging apparatus 101 that enables cooling of the mobile apparatus 201 during charging. This helps to prevent overheating of the mobile apparatus 201. As the charging coils 103 or the actuating circuitry 503 can be provided on the flexible diaphragm 105 this enables the cooling to be provided with few additional components being added to the charging apparatus 101.

In this description the term coupled means operationally coupled. Any number or combination of intervening elements can exist between coupled components including no intervening elements.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

The invention claimed is:

1. A charging apparatus comprising:
   one or more charging coils configured to transfer power to a mobile apparatus; and
   at least one flexible diaphragm configured so that movement of the flexible diaphragm directs air flow towards the mobile apparatus; and
   actuating circuitry configured to actuate movement of the flexible diaphragm, the actuating circuitry comprising one or more coils configured to electromagnetically interact with the one or more charging coils;
   wherein at least one of the one or more charging coils or actuating circuitry for actuating the one or more charging coils are mounted on the flexible diaphragm.

2. The charging apparatus as claimed in claim 1 comprising at least one ferrite shield provided between the one or more charging coils and the flexible diaphragm.

3. The charging apparatus as claimed in claim 1 wherein the charging coils are positioned on the diaphragm so as to control a bending mode of the flexible diaphragm.

4. The charging apparatus as claimed in claim 2 wherein the ferrite shield is also provided on the flexible diaphragm.

5. The charging apparatus as claimed in claim 2 wherein the ferrite shield is configured to direct a magnetic field generated by the one or more charging coils towards the mobile apparatus.

6. The charging apparatus as claimed in claim 2 wherein the ferrite shield is configured to, at least partially, block a magnetic field generated by the one or more charging coils from impinging circuitry within the charging apparatus.

7. The charging apparatus as claimed in claim 1 comprising one or more vents positioned above the flexible diaphragm and configured to enable air flow towards a mobile apparatus.

8. The charging apparatus as claimed in claim 1 comprising one or more vents configured to enable air flow towards circuitry within the charging apparatus.

9. The apparatus as claimed in claim 1 wherein at least part of the actuating circuitry is provided on the flexible diaphragm.

10. The charging apparatus as claimed in claim 1 wherein the charging coils are configured to receive data from the mobile apparatus.

11. The charging apparatus as claimed in claim 10 wherein the data received from the mobile apparatus comprises data relating to the temperature of the mobile apparatus.

12. The charging apparatus as claimed in claim 1 wherein the flexible diaphragm comprises an electrically insulating material.

13. A method comprising:
    using one or more charging coils to transfer power to a mobile apparatus;
    moving a flexible diaphragm to direct air flow towards the mobile apparatus; and
    mounting the one or more charging coils or actuating circuitry comprising one or more coils for actuating the one or more charging coils on the flexible diaphragm; and
    actuating the actuating circuitry to cause the one or more coils of the actuating circuitry to electromagnetically interact with the one or more charging coils to move the flexible diaphragm.

14. The method as claimed in claim 13 comprising providing a ferrite shield between the one or more charging coils and the flexible diaphragm.

15. The method as claimed in claim 13 comprising positioning the charging coils on the flexible diaphragm to control bending of the flexible diaphragm.

16. The method as claimed in claim 14 comprising providing the ferrite shield on the flexible diaphragm.

17. The method as claimed in claim 14 comprising using the ferrite shield to direct a magnetic field generated by the one or more charging coils towards the mobile apparatus.

18. The method as claimed in claim 14 comprising using the ferrite shield to at least partially block a magnetic field generated by the one or more charging coils from impinging on circuitry within the charging apparatus.

\* \* \* \* \*